United States Patent
Dancuart Kohler et al.

(10) Patent No.: US 7,147,775 B2
(45) Date of Patent: Dec. 12, 2006

(54) METHOD OF PURIFYING FISCHER-TROPSCH DERIVED WATER

(75) Inventors: Luis P. F. Dancuart Kohler, Vaalpark (ZA); Gert H. du Plessis, Secunda (ZA); Francois J. du Toit, Sasolburg (ZA); Edward L. Koper, Secunda (ZA); Trevor D. Phillips, Vanderbijlpark (ZA); Janette van der Walt, Vaalpark (ZA)

(73) Assignee: Sasol Technology (Pty) Ltd, Johannesburg (ZA)

( * ) Notice: Subject to any disclaimer, the term of this patent is extended or adjusted under 35 U.S.C. 154(b) by 189 days.

(21) Appl. No.: 11/014,500

(22) Filed: Dec. 16, 2004

(65) Prior Publication Data

US 2005/0131083 A1  Jun. 16, 2005

Related U.S. Application Data

(63) Continuation of application No. PCT/ZA03/00082, filed on Jun. 18, 2003.

(60) Provisional application No. 60/389,467, filed on Jun. 18, 2002.

(30) Foreign Application Priority Data

Jun. 18, 2002  (ZA) ................................. 2002/4845

(51) Int. Cl.
*C02P 3/00* (2006.01)
(52) U.S. Cl. ........................ 210/601; 210/620; 210/631
(58) Field of Classification Search ............... 201/601, 201/631, 620
See application file for complete search history.

(56) References Cited

U.S. PATENT DOCUMENTS

| | | | |
|---|---|---|---|
| 2,683,158 A | 7/1954 | Brown et al. |
| 4,746,434 A | 5/1988 | Grieves et al. |
| 4,948,511 A | 8/1990 | Swanson et al. |
| 5,429,942 A | 7/1995 | Kock et al. |
| 6,193,872 B1 | 2/2001 | Reason et al. |
| 6,225,358 B1 | 5/2001 | Kennedy |
| 6,462,097 B1 | 10/2002 | Martino et al. |

FOREIGN PATENT DOCUMENTS

EP  0 838 435  4/1998

(Continued)

OTHER PUBLICATIONS

UK Examination Report, GB 0314072.0, dated Sep. 21, 2005.

(Continued)

*Primary Examiner*—Chester T. Barry
(74) *Attorney, Agent, or Firm*—TraskBritt

(57) ABSTRACT

A process for the production of highly purified water from Fischer-Tropsch reaction water, which process includes at least the steps of a primary treatment stage comprising biological treatment for removing at least a fraction of dissolved organic carbon from the Fischer-Tropsch reaction water to produce a primary water-enriched stream, a secondary treatment stage comprising solid-liquid separation for removing at least some solids from at least a portion of the primary water-enriched stream to produce a secondary water-enriched stream, and a tertiary treatment stage comprising a dissolved salt and organic removal step for removing at least some dissolved salts and organic constituents from at least a portion of the secondary water-enriched stream.

18 Claims, 1 Drawing Sheet

FOREIGN PATENT DOCUMENTS

| | | |
|---|---|---|
| GB | 2 023 120 | 12/1979 |
| WO | WO 93/12242 | 6/1993 |
| WO | WO 98/18726 | 5/1998 |
| WO | WO 03/048272 A1 | 6/2003 |
| WO | WO 03/106346 A1 | 12/2003 |
| WO | WO 03/106349 A1 | 12/2003 |
| WO | WO 03/106353 | 12/2003 |
| WO | WO 03/106354 A1 | 12/2003 |

OTHER PUBLICATIONS

UK Search Report, GB 0314072.0, dated Nov. 21, 2003.
UK Examination Report, GB 0314072.0 dated Dec. 31, 2004.
Netherlands Search Report, NL 1023692, dated Jun. 18, 2003.
PCT International Search Report, PCT/ZA03/00082, dated Oct. 27, 2003.
PCT International Preliminary Examination Report, PCT/ZA03/00082, dated Oct. 29, 2004.
PCT Written Opinion, PCT/ZA03/00082..

METHOD OF PURIFYING FISCHER-TROPSCH DERIVED WATER

CROSS-REFERENCE TO RELATED APPLICATIONS

This application is a continuation of International Application No. PCT/ZA03/00082, filed Jun. 18, 2003, designating the United States of America, and published, in English, as PCT International Publication No. WO 03/106351 on Dec. 24, 2003, the contents of which are incorporated by this reference, which application claims priority to U.S. Provisional Patent Application Ser. No. 60/389,467 filed Jun. 18, 2002.

TECHNICAL FIELD

This invention relates to the purification of water produced during a Fischer-Tropsch synthesis for which synthesis a variety of carbonaceous materials are used as feedstock.

BACKGROUND OF THE INVENTION

The inventors herein are aware of processes for the synthesis of water from a carbonaceous feedstock, such as natural gas and coal, which processes also produce hydrocarbons.

One such process is the Fischer-Tropsch process of which the largest product is water and, to a lesser extent, hydrocarbons including olefins, paraffins, waxes, and oxygenates. There are numerous references to this process such as, for example on pages 265 to 278 of "Technology of the Fischer-Tropsch process" by Mark Dry, Catal. Rev. Sci. Eng., Volume 23 (1&2), 1981.

The products from the Fischer-Tropsch process may be processed further, for example by hydroprocessing, to produce products including synthetic crude oil, olefins, solvents, lubricating, industrial or medicinal oil, waxy hydrocarbons, nitrogen and oxygen containing compounds, motor gasoline, diesel fuel, jet fuel and kerosene. Lubricating oil includes automotive, jet, turbine and metal working oils. Industrial oil includes well drilling fluids, agricultural oils and heat transfer fluids.

In certain areas where carbonaceous feedstocks are to be found, water is in short supply and a relatively costly commodity. Also, environmental concerns prevent the dumping of polluted water derived from the Fischer-Tropsch process into natural waterways and the sea thereby presenting a case for the production and recovery of useable water at the source of the carbonaceous feedstocks.

The carbonaceous feedstocks typically include coal and natural gas that are converted to hydrocarbons, water and carbon dioxide during Fischer-Tropsch synthesis. Naturally, other carbonaceous feedstocks such as, for example, methane hydrates found in marine deposits, can also be used.

Before the water produced during the Fischer-Tropsch process is purified in accordance with the present invention, it is typically subjected to preliminary separation aimed at isolating a water-enriched stream from the Fischer-Tropsch products.

The preliminary separation process includes condensing the gaseous product from the Fischer-Tropsch reactor and separating it in a typical three-phase separator. The three streams exiting the separator are: a tail gas, a hydrocarbon condensate including mainly hydrocarbons in the $C_5$ to $C_{20}$ range and a reaction water stream containing dissolved oxygenated hydrocarbons, and suspended hydrocarbons.

The reaction water stream is then separated using a coalescer that separates the reaction water stream into a hydrocarbon suspension and a water-rich stream.

The coalescer is capable of removing hydrocarbons from the reaction water stream to a concentration of between 10 ppm and 1000 ppm, typically 50 ppm.

The water-enriched stream thus obtained forms the feedstock for the method according to the present invention and will be denoted in this specification by the term "Fischer-Tropsch reaction water."

The composition of the water-enriched stream or reaction water is largely dependent on the catalyst metal used in the Fischer-Tropsch reactor and the reaction conditions (e.g., temperature, pressure) employed. The Fischer-Tropsch reaction water can contain oxygenated hydrocarbons including aliphatic, aromatic and cyclic alcohols, aldehydes, ketones and acids, and to a lesser extent aliphatic, aromatic and cyclic hydrocarbons such as olefins and paraffins.

The Fischer-Tropsch reaction water may also contain small quantities of inorganic compounds including metals from the Fischer-Tropsch reactor, as well as nitrogen and sulfur containing species that originate from the feedstock.

The influence of the type of Fischer-Tropsch synthesis used on the quality of Fischer-Tropsch reaction water is illustrated in typical organic analysis (Table 1) of Fischer-Tropsch reaction water generated from three different synthesis operating modes, namely:

| | | |
|---|---|---|
| Low Temperature Fischer-Tropsch | LTFT | Cobalt or Iron catalysts |
| High Temperature Fischer-Tropsch | HTFT | Iron catalyst |

TABLE 1

Typical Organic Composition of Fischer-Tropsch reaction water from Different Fischer-Tropsch Synthesis Operating Modes

| Component (mass %) | LTFT (Cobalt Catalyst) | LTFT (Iron Catalyst) | HTFT (Iron Catalyst) |
|---|---|---|---|
| Water | 98.89 | 95.70 | 94.11 |
| non-acid oxygenated hydrocarbons | 1.00 | 3.57 | 4.47 |
| Acidic oxygenated hydrocarbons | 0.09 | 0.71 | 1.41 |
| Other Hydrocarbons | 0.02 | 0.02 | 0.02 |
| Inorganic components | <0.005 | <0.005 | <0.005 |

It is evident from the typical analyses of Fischer-Tropsch reaction waters of different origin (Table 1) that these waters, in particular HT Fischer-Tropsch reaction water, contain relatively high concentrations of organic compounds, and direct application or disposal of these waters is generally not feasible without further treatment to remove undesirable constituents. The degree of treatment of the Fischer-Tropsch reaction water depends largely on the intended application, and it is possible to produce a wide range of water qualities ranging from boiler feed water to partially treated water which may be suitable for discharge to the environment.

It is also possible to co-treat Fischer-Tropsch reaction water with other typical process waste water as well as rain water.

SUMMARY OF THE INVENTION

The water purification processes described herein may, after making minor adaptations, also be used for the processing of aqueous streams derived from generic synthesis gas conversion processes using metallic catalysts similar to the catalysts used during Fischer-Tropsch synthesis.

According to a first aspect of the invention, there is provided a process for the production of purified water from Fischer-Tropsch reaction water, which process includes at least the steps of:

(a) a primary treatment stage comprising biological treatment for removing at least a fraction of dissolved organic carbon from the Fischer-Tropsch reaction water to produce a primary water-enriched stream; and (b) a secondary treatment stage comprising solid-liquid separation for removing at least some solids from at least a portion of the primary water-enriched stream.

The term "purified water" is to be interpreted as meaning an aqueous stream having a COD of between 20 and 600 mg/l, a pH of between 6.0 and 9.0, a suspended solids content of less than 250 mg/l and a total dissolved solids content of less than 600 mg/l.

The dissolved organic carbon is typically selected from the group including: aldehydes, ketones, alcohols and organic acids.

The biological treatment of the primary treatment stage may comprise anaerobic treatment of the Fischer-Tropsch reaction water.

Fischer-Tropsch reaction water lends itself to anaerobic digestion since it contains mainly readily digestible short-chain organic molecules. Anaerobic digestion can take place over a wide range of temperatures, 5–60° C. but is usually conducted in the mesophilic range (i.e., 25–40° C.). The HRT depends largely on the type of Fischer-Tropsch reaction water being treated but typically requires a minimum HRT of 4 hours. For optimal performance the pH during anaerobic digestion should be maintained between pH 5.5 and pH 9.5, preferably pH 7–7.5.

Anaerobic technologies that have been successfully evaluated include Up-flow Anaerobic Sludge Blanket (UASB) processes, Fixed Bed systems, Fluidized Bed reactors, Stirred Tank reactors, Membrane Bioreactors, and Baffled reactors.

Apart from a water-rich or primary water-enriched stream, anaerobic digestion typically yields methane, carbon dioxide and sludge as by-products.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertilizer or soil conditioner.

Should the Fischer-Tropsch reaction water originate from a cobalt-based LTFT process, the primary treatment stage typically only comprises anaerobic treatment for which the HRT in the anaerobic reactor may be between 10 and 90 hours, typically about 50 hours. HRT is largely dictated by the anaerobic reactor type and the desired quality of the treated water.

The untreated cobalt based LTFT reaction water may have a chemical oxygen demand of between 5000 and 50000 mg/l, typically about 20000 mg/l.

Should anaerobic treatment alone as primary treatment not yield satisfactory results in that the amount of dissolved organic carbon in the primary water-enriched stream is still too high after treatment, an additional stage comprising aerobic treatment may be included as a part of the biological treatment in the primary treatment stage. This is typically the case when the Fischer-Tropsch reaction water originates from an iron-based LTFT and HTFT processes.

A wide range of technologies may be used for aerobic treatment of the water enriched stream obtained from anaerobic treatment.

Such technologies may be selected from the group including Activated Sludge processes, High-rate Compact Reactors, Biological Aerated Filters, Trickling filters, Rotating Biological Contacters, Membrane Bioreactors, and Fluidized Bed reactors. The aerobic production of Single Cell Protein (SCP) has also been successfully developed.

Aerobic treatment is preferably conducted within the mesophilic temperature range (i.e., 25–40° C.). For aerobic treatment, the reactor pH should be maintained between pH 5.5 to 9.5, typically at pH 7–7.5.

Apart from a water-rich or primary water-enriched stream, aerobic treatment typically yields carbon dioxide and sludge as by-products. The carbon dioxide may be released to the environment. The sludge may be incinerated, used as land fill, fertilizer, soil conditioner or as a source of SCP.

The anaerobic and/or aerobic treatment may include adding nutrients in the form of nitrogen (e.g., urea, ammonia or ammonium salts) and phosphorus (e.g., phosphate salts) containing compounds to accelerate microbiological degradation of the organic constituents. In addition, pH control using alkali salts such as lime, caustic and soda ash may be required due to the acidity of the water.

The primary water-enriched stream may be subjected to further aerobic treatment in the form of the evaporation wherein the primary water-enriched stream is used as make up water to an evaporative cooling tower.

During evaporation in the cooling tower, the amount of at least some of the dissolved organic constituents contained in the primary water-enriched stream are reduced through the action of micro-organisms. The constituents being removed totally or partially include acidic oxygenated hydrocarbons and methanol.

By using the primary water-enriched stream as cooling water, the abundance of oxygen caused by aeration in the cooling tower activates the growth of micro-organisms that use dissolved organic constituents in the primary water-enriched stream as food source.

The evaporative cooling tower may be selected from the group including: mechanical-draft cooling towers, natural-draft cooling towers and forced-draft cooling towers.

When using the primary water-enriched stream as cooling water, the linear flow velocity of said water through the equipment being used in the cooling must be sufficiently high enough to inhibit deposition of suspended solids in said equipment.

One or more suitable additives may be added to the primary water-enriched stream before using it as cooling water to inhibit undesirable effects such as, for example, fouling, corrosion and scaling.

The secondary treatment stage may be aimed at removing suspended solids from the primary water-enriched stream.

Suspended solid removal may be achieved by methods selected from the group including: sand filtration, membrane separation (e.g., micro- or ultrafiltration), sedimentation (with or without the use of flocculants), dissolved air flotation (with or without the use of flocculants) and centrifugation.

Applications for the purified water produced by the method described above may include its use as cooling water (as discussed above), irrigation water or general process water. Depending on local discharge standard, particularly with respect to residual COD concentrations, this water may be released to the environment.

The purified water typically has the following characteristics:

| Property | | |
|---|---|---|
| Chemical Oxygen Demand (COD) | mg/l | 20–600 |
| PH | | 6.0–9.0 |
| Suspended solids (SS) | mg/l | <250 |
| Total Dissolved Solids (TDS) | mg/l | <600 |

According to a second aspect of the invention, there is provided a process for the production of highly purified water from Fischer-Tropsch reaction water, which process includes at least the steps of:
 (a) a primary treatment stage comprising biological treatment for removing at least a fraction of dissolved organic carbon from the Fischer-Tropsch reaction water to produce a primary water-enriched stream;
 (b) a secondary treatment stage comprising solid-liquid separation for removing at least some solids from at least a portion of the primary water-enriched stream to produce a secondary water-enriched stream; and
 (c) a tertiary treatment stage comprising a dissolved salt and organic removal step for removing at least some dissolved salts and organic constituents from at least a portion of the secondary water-enriched stream.

The term "highly purified water" is to be interpreted as meaning an aqueous stream having a COD of less than 50 mg/l, a pH of between 6.0 and 9.0, a suspended solids content of less than 50 mg/l and a total dissolved solids content of less than 100 mg/l.

The dissolved organic carbon is typically selected from the group including: aldehydes, ketones, alcohols and organic acids.

The primary treatment stage may comprise anaerobic treatment of the Fischer-Tropsch reaction water.

Fischer-Tropsch reaction water lends itself to anaerobic digestion since it contains mainly readily digestible short-chain organic molecules. Anaerobic digestion can take place over a wide range of temperatures, 5–60° C. but is usually conducted in the mesophilic range (i.e., 25–40° C). The HRT depends largely on the type of Fischer-Tropsch reaction water being treated but typically requires a minimum HRT of 4 hours. For optimal performance the pH during anaerobic digestion should be maintained between pH 5.5 and pH 9.5, preferably pH 7–7.5.

Anaerobic technologies that have been successfully evaluated include Up-flow Anaerobic Sludge Blanket (UASB) processes, Fixed Bed systems, Fluidized Bed reactors, Stirred Tank reactors, Membrane Bioreactors and Baffled reactors.

Apart from a water-rich or primary water-enriched stream, anaerobic digestion typically methane, carbon dioxide and sludge as by-products.

The methane may be released to the environment via an acceptable system or, preferably, recovered. Recovered methane may be used as a fuel or energy source or returned for reforming (where natural gas is used as a feedstock for the Fischer-Tropsch synthesis process) or it may be chemically or biologically converted to products.

The sludge may be incinerated, used as land fill or as a fertilizer or soil conditioner.

Should the Fischer-Tropsch reaction water originate from a cobalt-based LTFT process, the primary treatment stage typically only comprises anaerobic treatment for which the HRT in the anaerobic reactor may be between 10 and 90 hours, typically about 50 hours. HRT is largely dictated by the anaerobic reactor type and the desired quality of the treated water.

The untreated cobalt based LTFT reaction water may have a chemical oxygen demand of between 5000 and 50000 mg/l, typically about 20000 mg/l.

Should anaerobic treatment alone as primary treatment not yield satisfactory results in that the amount of dissolved organic carbon in the primary water-enriched stream is still too high after treatment, an additional stage comprising aerobic treatment may be included as a part of the biological treatment in the primary treatment stage. This is typically the case when the Fischer-Tropsch reaction water originates from an iron-based LTFT and HTFT processes.

A wide range of technologies may be used for aerobic treatment of the water enriched stream obtained from anaerobic treatment.

Such technologies may be selected from the group including: Activated Sludge processes, High-rate Compact Reactors, Biological Aerated Filters, Trickling filters, Rotating Biological Contacters, Membrane Bioreactors, and Fluidized Bed reactors. The aerobic production of Single Cell Protein (SCP) has also been successfully developed.

Aerobic treatment is preferably conducted within the mesophilic temperature range (i.e., 25–40° C.). For aerobic treatment, the reactor pH should be maintained between pH 5.5 to 9.5, typically at pH 7–7.5.

Apart from a water-rich or primary water-enriched stream, aerobic treatment typically yields carbon dioxide and sludge as by-products. The carbon dioxide may be released to the environment. The sludge may be incinerated, used as land fill, fertilizer, soil conditioner or as a source of SCP.

The anaerobic and/or aerobic treatment may include adding nutrients in the form of nitrogen (e.g., urea, ammonia or ammonium salts) and phosphorus (e.g., phosphate salts) containing compounds to accelerate microbiological degradation of the organic constituents. In addition, pH control using alkali salts such as lime, caustic and soda ash may be required due to the acidity of the water.

The primary water-enriched stream may be subjected to further aerobic treatment in the form of the evaporation wherein the primary water-enriched stream is used as make up water to an evaporative cooling tower.

During evaporation in the cooling tower, the amount of at least some of the dissolved organic constituents contained in the primary water-enriched stream are reduced through the action of micro-organisms. The constituents being removed totally or partially include acidic oxygenated hydrocarbons and methanol.

By using the primary water-enriched stream as cooling water, the abundance of oxygen caused by aeration in the cooling tower activates the growth of micro-organisms that use dissolved organic constituents in the primary water-enriched stream as food source.

The evaporative cooling tower may be selected from the group including: mechanical-draft cooling towers, natural-draft cooling towers and forced-draft cooling towers.

When using the primary water-enriched stream as cooling water, the linear flow velocity of said water through the equipment being used in the cooling must sufficiently high enough to inhibit deposition of suspended solids in said equipment.

One or more suitable additives may be added to the primary water-enriched stream before using it as cooling water to inhibit undesirable effects such as, for example, fouling, corrosion and scaling.

The secondary treatment stage may be aimed at removing suspended solids from the primary water-enriched stream.

Suspended solid removal may be achieved by methods selected from the group including: sand filtration, membrane separation (e.g., micro- or ultrafiltration), sedimentation (with or without the use of flocculants), dissolved air flotation (with or without the use of flocculants) and centrifugation.

During the tertiary treatment stage residual organic species, not removed during the first and second treatment stages, may be removed by methods selected from the group including: chemical oxidation using agents such as ozone and hydrogen peroxide, ultraviolet light generated free radicals and adsorption/absorption processes including activated carbon treatment and organic scavenging resins.

Dissolved salts originating from primary treatment (i.e., pH control chemicals, nutrient addition) and/or from co-treatment of other process effluents, may be removed by methods selected from the group including: ion exchange, nano-filtration, reverse osmosis, and chemical precipitation processes including hot and cold lime softening.

Typical uses for the highly purified water, over and above those mentioned for purified water, typically include drinking water and boiler feed water.

The highly purified water typically has the following characteristics:

| Property | | |
|---|---|---|
| Chemical Oxygen Demand (COD) | mg/l | <50 |
| pH | | 6.0–9.0 |
| Suspended solids (SS) | mg/l | <50 |
| Total Dissolved Solids (TDS) | mg/l | <100 |

Advantages inherent in the purified and highly purified water produced according to the present invention are that the water will contain only a small amount of dissolved solids because the Fischer-Tropsch reaction water is essentially a solids-free stream. The low levels of residual salts in the purified water are a result of controlled addition of chemicals used during the purification process sequence and/or the co-treatment of other dissolved solids containing effluents. The residual salts could include Ca, Mg, Na, K, Cl, $SO_4$, $HCO_3$ and $CO_3$ combinations. The low dissolved solids concentrations in Fischer-Tropsch reaction water can simplify and reduce the costs of the purification process.

BRIEF DESCRIPTION OF THE DRAWINGS

The invention will now be described by way of the following non-limiting examples with reference to the accompanying drawings.

DETAILED DESCRIPTION OF THE INVENTION

Figure 1:
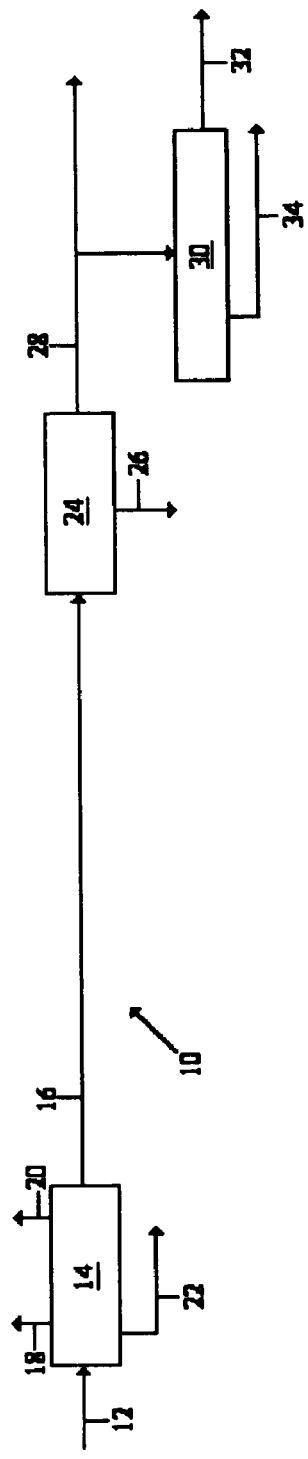
FIG. 1 shows a simplified process flow diagram of a first embodiment of a process according to the present invention.

In the drawings, reference numeral 10 generally indicates a process for the production of purified and/or highly purified water from Fischer-Tropsch reaction water 12.

Referring now to FIG. 1, the process 10 includes a primary treatment stage comprising anaerobic digestion 14 for removing at least a fraction of dissolved organic constituents from the Fischer-Tropsch reaction water 12.

Anaerobic digestion 14 yields a primary water-enriched stream 16, methane 18, carbon dioxide 20 and sludge 22 as products.

The process 10 shown in FIG. 1 is typically used for Fischer-Tropsch reaction water 12 that originates from an LTFT process.

The primary water-enriched stream 16 is subjected to further treatment in a secondary treatment stage comprising solid-liquid separation 24 that yields sludge 26 and a stream of purified water 28.

The purified water 28 can optionally be subjected to a tertiary treatment stage comprising a dissolved salt and organic removal step 30 which yields a stream of highly purified water 32 and sludge 34.

Figure 2:
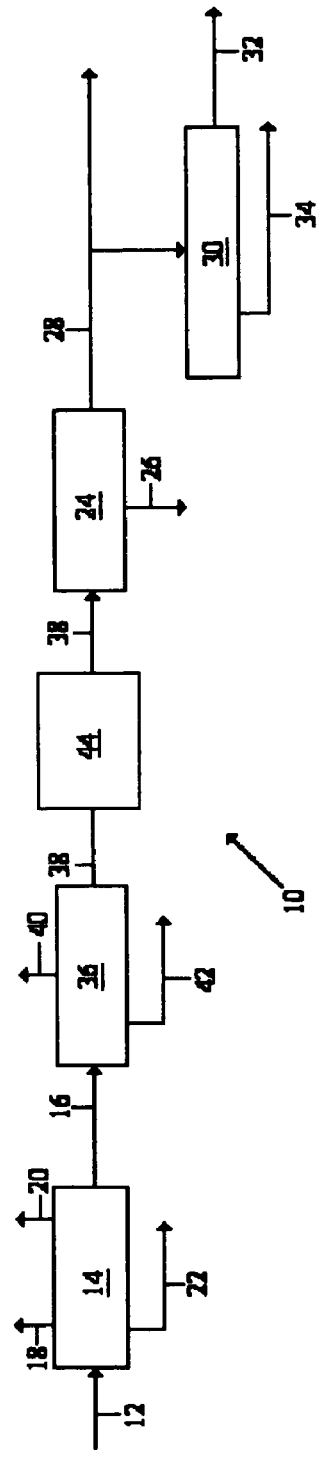
FIG. 2 shows a simplified process flow diagram of a second embodiment of a process according to the present invention.

Referring now to FIG. 2, should anaerobic treatment 14 alone as primary treatment not yield satisfactory results in that the amount of dissolved organic constituents in the primary water-enriched stream 16 is still too high after treatment, an additional stage comprising aerobic treatment 36 is included in the primary treatment stage. This is typically the case when the Fischer-Tropsch reaction water originates from an HTFT process.

Aerobic digestion 36 yields a primary water-enriched stream 38, carbon dioxide 40 and sludge 42.

After aerobic treatment, the primary water-enriched stream 38 can optionally be fed to an evaporative cooling tower 44 in which at least some of the dissolved organic constituents contained in the primary water-enriched 38 stream are reduced through the action of micro-organisms The primary water-enriched stream 38 from the cooling tower 44 is subjected to further treatment in a secondary treatment stage comprising solid-liquid separation 24 which yields sludge 26 and a stream of purified water 28.

The purified water 28 can optionally be subjected to a tertiary treatment stage comprising a dissolved salt and organic removal step 30 which yields a stream of highly purified water 32 and sludge 34.

Depending on the final intended use of the purified 28 or highly purified water 32, the minimum water quality requirements are as set out in Table 2 below and the operating conditions of the equipment used in the method as well as suitable treatment options can be selected accordingly.

TABLE 2

| Water Quality - Typical Requirements | | | | | |
|---|---|---|---|---|---|
| | Process Water | Irrigation water | Cooling water | Boiler feed water | Drinking water |
| COD mg/l | 0–75 | | 0–30 | 0–10 | |
| pH | 5–10 | 6.5–8.4 | 6.5–8 | 7–8 | 6–9 |
| TDS mg/l | 0–1600 | <40 | 0–450 | 0–100 | 0–450 |
| SS mg/l | 0–25 | 0–50 | 0–5 | 0–3 | <20 |

Having described the basic aspects of the invention, the following example is given to further illustrate a specific embodiment thereof.

The flow diagram for the example is essentially the diagram of FIG. 2.

EXAMPLE 1

Treatment of Fischer-Tropsch Reaction Water Originating from an LTFT in Which a Cobalt Catalyst Was Used to Produce Purified Water After separation of by-products, a continuous Fischer-Tropsch reaction water stream originating from an LTFT process was degassed at atmospheric pressure.

Free hydrocarbons in the reaction water were reduced to 0.005% (mass %) using a coalescer. The temperature of the reaction water was reduced to 37° C. using a plate heat exchanger. The composition of the reaction water is shown in Table 3 below.

Primary treatment of the reaction water was undertaken using a packed-bed down flow anaerobic digester. The reactor was operated at a HRT of 48–52 h and a COD loading rate of ca. 8–12 kg/m$^3$.d. The pH of the reactor was maintained between pH 6.8–7.2 using caustic soda (NaOH).

TABLE 3

Typical Composition of LTFT Reaction Water Feed and Effluent from Anaerobic Digestion

| Component | Reaction water feed to anaerobic digestion (mass %) | Reaction water - effluent from anaerobic digestion (mass %) |
|---|---|---|
| Water | 97.634 | 99.887 |
| Acetaldehyde | 0.019 | 0.002 |
| Propionaldehyde | 0.002 | 0.000 |
| Butyraldehyde | 0.001 | 0.000 |
| Acetone | 0.007 | 0.000 |
| MPK | 0.001 | 0.000 |
| Methanol | 0.434 | 0.020 |
| Ethanol | 0.369 | 0.022 |
| Propanol | 0.140 | 0.005 |
| iso-Propanol | 0.002 | 0.000 |
| Butanol | 0.056 | 0.001 |
| Pentanol | 0.047 | 0.001 |
| iso-Pentanol | 0.001 | 0.000 |
| Hexanol | 0.019 | 0.000 |
| Iso-Hexanol | 0.001 | 0.000 |
| Heptanol | 0.007 | 0.000 |
| Other NAC | 0.004 | 0.001 |
| Total NAC | 1.106 | 0.051 |
| Formic acid | 0.025 | 0.001 |
| Acetic acid | 0.039 | 0.002 |
| Propionic acid | 0.002 | 0.001 |
| Butyric acid | 0.002 | 0.000 |
| Other acids | 0.006 | 0.001 |
| Total Acids | 0.070 | 0.005 |
| Hydrocarbons | 0.005 | 0.001 |
| Chemical Oxygen Demand (COD in mg/l) | 12800 | 600 |

The COD concentration in the reaction water after anaerobic treatment was ca. 600 mg/l and the SS concentration was ca. 200 mg/l. The COD and SS concentrations in the primary treated reaction water were further reduced to ca. 60 mg $O_2$/l and 30 mg SS/l, respectively using activated sludge treatment as an aerobic treatment step. The activated sludge system was operated under the following conditions:

pH: 7.2 to 7.5

The dissolved oxygen concentration in the activated sludge basin was maintained above 1.5 mg $O_2$/l
Temperature: 33–35° C.
HRT: 38 h
F/M ratio: 0.35 kg COD/kg MLSS
Cell retention time (sludge age): 25 d
Feed to recycle ratio: 1:2.5

Nutrient carry-over from the anaerobic treatment was sufficient to sustain the process and accordingly, no additional nutrients were required.

A sludge yield of 0.16 kg sludge/kg feed COD was obtained and the sludge was de-watered and incinerated.

Conventional sand filtration was used to reduce the SS concentration to <30 mg/l.

The thus obtained purified water has application as both irrigation water and process cooling water.

In order to obtain highly purified water, a portion of the purified water from the sand filter was diverted to a cross-flow membrane unit fitted with a 0.2 μm polypropylene microfiltration membrane. A permeate flux rate of 70–80 l/m$^2$.h was obtained during stable operation of the unit, and the water recovery across the unit varied between 75–85%. The resultant SS and COD concentrations in the permeate from the microfiltration unit were <5 SS mg/l and 50 mg $O_2$/l, respectively.

The pH of the purified water from the microfiltration unit was adjusted to pH 8.5 using sodium hydroxide, and the purified water was pumped to a reverse osmosis unit fitted with a high rejection sea water polyamide membrane. A permeate flux rate of 15–25 l/m$^2$.h was obtained during stable operation of the unit, and the water recovery across the unit varied between 85–90%. The reverse osmosis unit yielded a highly purified water stream containing COD and TDS concentrations of <20 mg $O_2$/l and <10 mg TDS/l.

It is to be appreciated that the invention is not limited to any specific embodiment or configuration as hereinbefore generally described or illustrated, for example, rain water or water enriched streams from processes other than Fischer-Tropsch synthesis may be purified according to the process described above.

What is claimed is:

1. A process for the production of purified water from Fischer-Tropsch reaction water containing oxygenated hydrocarbons, aliphatic, aromatic and cyclic hydrocarbons and inorganic compounds, wherein the purified water is an aqueous stream having a COD of between 20 and 600 mg/l, a pH of between 6.0 and 9.0, a suspended solids content of less than 250 mg/l and a total dissolved solids content of less than 600 mg/l, which process includes at least the steps of:
   a) a primary treatment stage comprising biological treatment for removing at least a fraction of dissolved organic carbon from the Fischer-Tropsch reaction water to produce a primary water-enriched stream;
   b) a secondary treatment stage comprising evaporation of at least a portion of the primary water-enriched stream thereby to reduce the total mass fraction of organic constituents in the unevaporated portion to produce a secondary water-enriched stream; and
   c) a tertiary treatment stage comprising solid-liquid separation for removing at least some solids from at least a portion of the secondary water-enriched stream.

2. The process of claim 1 wherein the dissolved organic carbon is selected from the group including: aldehydes, ketones, alcohols, and organic acids.

3. The process of claim 1 wherein the biological treatment includes one or both of:

anaerobic treatment selected from the group including: Up-flow Anaerobic Sludge Blanket (UASB) processes, Fixed Bed systems, Fluidized Bed reactors, Stirred Tank reactors, Membrane Bioreactors, and Baffled reactors; and aerobic treatment selected from group including: Activated Sludge processes, Biological Aerated Filters, Trickling filters, Rotating Biological Contacters, High-rate Compact Reactors, Membrane Bioreactors, and Fluidized Bed reactors.

4. The process of claim 1 wherein the evaporation takes place by using the primary water-enriched stream as make up water to an evaporative cooling tower at ambient temperature and pressure in a cooling tower.

5. The process of claim 4 wherein the evaporative cooling tower is selected from the group including: mechanical-draft cooling towers, natural-draft cooling towers, and forced-draft cooling towers.

6. The process of claim 1 wherein the tertiary treatment stage removes suspended solids from the secondary water-enriched stream produced during evaporation by one or more method selected from the group including: sand filtration, membrane separation, flocculation sedimentation, dissolved air flotation with the use of flocculants, dissolved air flotation without the use of flocculants, and centrifugation.

7. The process of claim 6 wherein the membrane separation method includes one or both of microfiltration and ultrafiltration.

8. A process for the production of highly purified water from Fischer-Tropsch reaction water containing oxygenated hydrocarbons, aliphatic, aromatic and cyclic hydrocarbons and inorganic compounds, wherein the highly purified water is an aqueous stream having a COD of less than 50 mg/l, a pH of between 6.0 and 9.0, a suspended solids content of less than 50 mg/l and a total dissolved solids content of less than 100 mg/l, and wherein the process includes at least the steps of:

a) a primary treatment stage comprising biological treatment for removing at least a fraction of dissolved organic carbon from the Fischer-Tropsch reaction water to produce a primary water-enriched stream;

b) a secondary treatment stage comprising evaporation of at least a portion of the primary water-enriched stream thereby to reduce the total mass fraction of organic constituents in the unevaporated portion to produce a secondary water-enriched stream;

c) a tertiary treatment stage comprising solid-liquid separation for removing at least some solids from at least a portion of the secondary water-enriched stream to produce a tertiary water-enriched stream; and d) a final treatment stage comprising a dissolved salt and organic removal step for removing at least some dissolved salts and organic constituents from at least a portion of the tertiary water-enriched stream.

9. The process of claim 8 wherein the dissolved organic carbon is selected from the group including: aldehydes, ketones, alcohols, and organic acids.

10. The process of claim 8 wherein the biological treatment includes one or both of:

anaerobic treatment selected from the group including: Up-flow Anaerobic Sludge Blanket (UASB) processes, Fixed Bed systems, Fluidized Bed reactors, Stirred Tank reactors, Membrane Bioreactors and Baffled reactors; and aerobic treatment selected from group including: Activated Sludge processes, Biological Aerated Filters, Trickling filters, Rotating Biological Contacters, High-rate Compact Reactors, Membrane Bioreactors, and Fluidized Bed reactors.

11. The process of claim 8 wherein the evaporation takes place by using the primary water-enriched stream as make up water to an evaporative cooling tower at ambient temperature and pressure.

12. The process of claim 11 wherein the evaporative cooling tower is selected from the group including: mechanical-draft cooling towers, natural-draft cooling towers, and forced-draft cooling towers.

13. The process of claim 8 wherein the tertiary treatment stage removes suspended solids from the primary water-enriched stream produced during biological treatment by one or more method selected from the group including: sand filtration, membrane separation, flocculation sedimentation, dissolved air flotation with the use of flocculants, dissolved air flotation without the use of flocculants, and centrifugation.

14. The process of claim 13 wherein the membrane separation method includes one or both of microfiltration and ultrafiltration.

15. The process of claim 8 wherein the organic constituents are removed in the final treatment stage by one or more method selected from the group including: chemical oxidation, ultraviolet light generated free radicals, adsorption and/or absorption processes.

16. The process of claim 15 wherein the adsorption/absorption processes include one or both of activated carbon treatment and the use of organic scavenging resins.

17. The process of claim 8 wherein dissolved salts are reduced in the final treatment stage by one or more method selected from the group including: ion exchange, reverse osmosis, nano-filtration, and chemical precipitation processes.

18. The process of claim 17 wherein the chemical precipitation processes are selected from one or both of hot lime softening and cold lime softening.

* * * * *